United States Patent

Chevalier et al.

Patent Number: 6,164,061
Date of Patent: Dec. 26, 2000

[54] FUEL-INJECTING APPARATUS FOR RAMJET ENGINE COOLED BY TRANSPIRATION

[75] Inventors: Alain Chevalier, Asnieres les Bourges; Marc Bouchez, Bourges, both of France

[73] Assignee: Aerospatiale Societe Nationale Industrielle, Paris, France

[21] Appl. No.: 09/101,841

[22] PCT Filed: Dec. 2, 1997

[86] PCT No.: PCT/FR97/02176

§ 371 Date: Jul. 17, 1998

§ 102(e) Date: Jul. 17, 1998

[87] PCT Pub. No.: WO98/25083

PCT Pub. Date: Jun. 11, 1998

[30] Foreign Application Priority Data

Dec. 3, 1996 [FR] France ................................ 96 14786

[51] Int. Cl.⁷ .................. F23R 3/20; F02K 7/10
[52] U.S. Cl. .............................. 60/267; 60/270.1
[58] Field of Search ................... 60/267, 270.1

[56] References Cited

U.S. PATENT DOCUMENTS

| | | |
|---|---|---|
| 3,556,443 | 1/1971 | Kidwell . |
| 3,699,773 | 10/1972 | Schuning et al. . |
| 3,727,409 | 4/1973 | Kelley et al. . |
| 3,808,833 | 5/1974 | Allen et al. . |
| 4,986,068 | 1/1991 | Lee et al. ................................ 60/270.1 |
| 5,214,914 | 6/1993 | Billig et al. ............................ 60/270.1 |
| 5,396,761 | 3/1995 | Woltmann et al. . |
| 5,452,866 | 9/1995 | Bulman ..................................... 60/265 |
| 5,660,040 | 8/1997 | Henry et al. . |
| 5,899,061 | 5/1999 | Bouchez et al. ...................... 60/270.1 |

FOREIGN PATENT DOCUMENTS

| | | |
|---|---|---|
| 1177045 | 4/1959 | France . |
| 2636677 | 3/1990 | France . |
| 2706588 | 12/1994 | France . |
| 2329346 | 2/1975 | Germany . |

OTHER PUBLICATIONS

Patent Abstracts of Japan—Publication No. 05079628, Mar. 30, 1993. Tamaru Taku—Combustion Machine for High–Speed Aeronautical Engine—Abstract.

*Primary Examiner*—Ted Kim
*Attorney, Agent, or Firm*—Stevens, Davis, Miller & Mosher, L.L.P.

[57] ABSTRACT

A fuel injection strut for a ramjet adapted to operate at high Mach numbers includes a combustion chamber into which a flow of combustion-supporting gas is introduced. A first end of the strut includes a stem having a leading edge with a dihedral shaped wall for defining a chamber on a concave side for receiving the flow of combustion supporting gas. An injection member generates a plurality of jets impinging cooling fluid on the concave side of the wall to cool the strut. The leading edge provides two-way permeability so that at lower speeds, air permeates through the leading edge to facilitate pilot combustion in the combustion chamber, and a higher speeds, the cooling fluid permeates through the leading edge to cool the strut.

14 Claims, 6 Drawing Sheets

FUEL-INJECTING APPARATUS FOR RAMJET ENGINE COOLED BY TRANSPIRATION

This is a 371 of PCT/FR97/02176 filed Dec. 2, 1997.

BACKGROUND OF THE INVENTION

1. Field of the Invention

The present invention concerns a fuel injection strut for a ramjet operating over a wide range of Mach numbers, especially at a high Mach number, for example in the order of 12 to 15.

2. Description of the Related Art

Ramjets are known to be particularly advantageous for propulsion of hypersonic aircraft (guided weapons, missiles, aircraft, etc) as they can operate over a wide range of Mach numbers, for example from 2 to 15, and have a low specific fuel consumption. Depending on the particular application of an aircraft, and possibly on the aircraft's flight phase, the fuel used can be a liquid hydrocarbon such as kerosene, for example, or a gas such as hydrogen or methane, for example.

A ramjet has, on the one hand, at least one inlet for combustion-supporting gas, usually consisting of an air cowling or an air intake, directing a flow of combustion-supporting gas (in particular air) towards a combustion chamber, and, on the other hand, at least one injection device for injecting the fuel into said flow of combustion-supporting gas so as to obtain a flow of fuel/combustion-supporting gas mixture that is ignited in said combustion chamber.

In ramjets designed to operate at a relatively low Mach number (for example up to Mach 2), a fuel injection device of the above kind can be made up of a set of individual injectors disposed on the inside wall of the ramjet at the periphery of the flow of combustion-supporting gas.

However, for operations at high Mach numbers, when combustion in the ramjet occurs in a supersonic or hypersonic flow, the fuel can no longer be injected only at the inside wall of the ramjet. In this case the penetration of the jets of fuel into the flow of combustion-supporting gas is too small for good mixing of the fuel and the combustion-supporting gas to be obtained within said flow, with the result that combustion is poor or even impossible. This problem is naturally aggravated if the transverse dimensions of the flow of combustion-supporting gas are larger.

To remedy this, injection devices have been designed in the form of manifolds with a plurality of individual injectors disposed along their length, which are disposed in and transversely to the flow of combustion-supporting gas, with the ends of said manifolds attached to opposite walls of said ramjet. An injection device of this kind is generally called an "injection strut" and is used either in isolation or in combination with injection of fuel at the wall.

With injection struts it is possible to obtain a satisfactory fuel/combustion-supporting gas mixture throughout the cross-section of the flow of combustion-supporting gas. More generally, injection struts in hypersonic ramjets:

assure a supply of fuel throughout the flow of combustion-supporting gas, despite the low penetration of the jets of fuel into a flow of combustion-supporting gas at hypersonic velocity;
  increase the proportion of fuel in the fuel/combustion-supporting gas mixture;
  assist ignition of the fuel/combustion-supporting gas mixture and stabilization of the flame;
  contribute to compression of the flow of combustion-supporting gas by slowing the flow of combustion-supporting gas scooped up by the ramjet.

Injection struts of the above kind, which are subject to the action of the flow of combustion-supporting gas, each behave, from the aerodynamic point of view, like a wing the ends of which are built into two opposite walls of the ramjet. On their stem side, opposite the fuel injectors disposed at the stern of the strut, which receives the flow of combustion-supporting gas, said injection struts must have a leading edge with a small radius to reduce pressure losses, which would limit the propulsive performance of the ramjet and could even lead to blockage of the flow of combustion-supporting gas, which can remain hypersonic within the combustion chamber only if the combustion-supporting gas velocity on its upstream side is sufficiently high.

However, heating of said stem caused by the hypersonic flow of combustion-supporting gas is substantially inversely proportional to the square root of the radius of the leading edge of said stem. Consequently a stem with a small radius leading edge is subject to intense heating. Note further that, said injection struts being disposed inside the ramjet, it is impossible to cool them by radiation with the air through which the aircraft propelled by said ramjet is flying. A stem of this kind is therefore subjected to very high temperatures, in the order of 5 000 K in the case of an aircraft flying at Mach 12 at an altitude in the order of 30 km. It is therefore necessary to construct the injection struts from materials such as ceramics, the radius of said leading edge being in the order of 3 to 5 mm. However, given current processes for manufacturing ceramic parts, it is evident that the fabrication of ceramic material injection struts, which must satisfy the requirement for high precision, is necessarily long and costly.

SUMMARY OF THE INVENTION

An aim of the present invention is to remedy these drawbacks. The present invention concerns an injection strut for hypersonic ramjets which has a small radius leading edge but can be made from materials other than ceramics.

To this end, the fuel injection strut for a ramjet designed to operate at a high Mach number and including a combustion chamber into which is introduced a flow of combustion-supporting gas, said strut including a stem having a leading edge receiving said flow of combustion-supporting gas and forming, at the stern of said strut, a manifold of individual fuel injectors, disposed in said flow of combustion-supporting gas transversely to the latter and distributing said fuel into said flow of combustion-supporting gas, is remarkable, in accordance with the invention, in that:

said stem is formed, at least in the vicinity of its leading edge, by a permeable wall, and
said strut includes:
  a chamber provided in the concave side of said permeable wall of the stem, and
  means for injecting a cooling fluid into said chamber, said injection means being adapted to generate a plurality of jets of a cooling fluid distributed along the height of said stem and impinging on the concave face of said permeable wall, at least in the region of said leading edge, so as to pass through said permeable wall.

Thus cooling of the leading edge of the strut is obtained by injecting a cooling fluid through it at the highest speeds. Moreover, as explained in more detail below, this permeability of the leading edge also facilitates ignition at the lowest speeds by admitting air at the lowest speeds, so exploiting the "two-way" permeability of the leading edge (this is explained in more detail below).

For example, said wall of the stem can be made, at least in the vicinity of the leading edge of the latter, from a material permeable to the jets of cooling fluid, or it can have at least one series of perforations along the leading edge of the stem, or at least one slot extending along the leading edge of the stem.

The cooling fluid advantageously consists of fuel.

In accordance with another feature of the invention, said stem is a substantially dihedral shape part the edge of which forms the leading edge of the stem and the concave side of which defines a chamber.

The strut advantageously includes a body defining an internal cavity inside the injection strut in which there are disposed a plurality of individual chambers each in the form of a perforated cylinder open at both ends.

Said individual chambers are disposed one above the other and at a certain distance from each other within said cavity in a row.

A first end of each chamber preferably opens into the concave side of said stem and each other end of said chambers, at the stern of the injection strut, is in the form of a main fuel injector.

In accordance with another feature of the invention a part in the form of a cap with corresponding orifices covers all of the first ends of said chambers.

A secondary fuel injector is advantageously provided at the stern of the strut, in each gap between two individual chambers.

Also, fuel can be supplied to said strut via supply passages in the ends of the strut built into the opposite walls of the injection chamber of the ramjet.

Moreover, the strut can comprise sensors for measuring the pressure at the leading edge, that inside the strut and the fuel supply pressure, together with a sensor for measuring the temperature of the wall of the leading edge.

BRIEF DESCRIPTION OF THE DRAWINGS

The figures of the accompanying drawings show how the invention can be put into effect. In the figures the same reference numbers designate similar items.

DETAILED DESCRIPTION OF THE PREFERRED EMBODIMENTS

Figure 1:
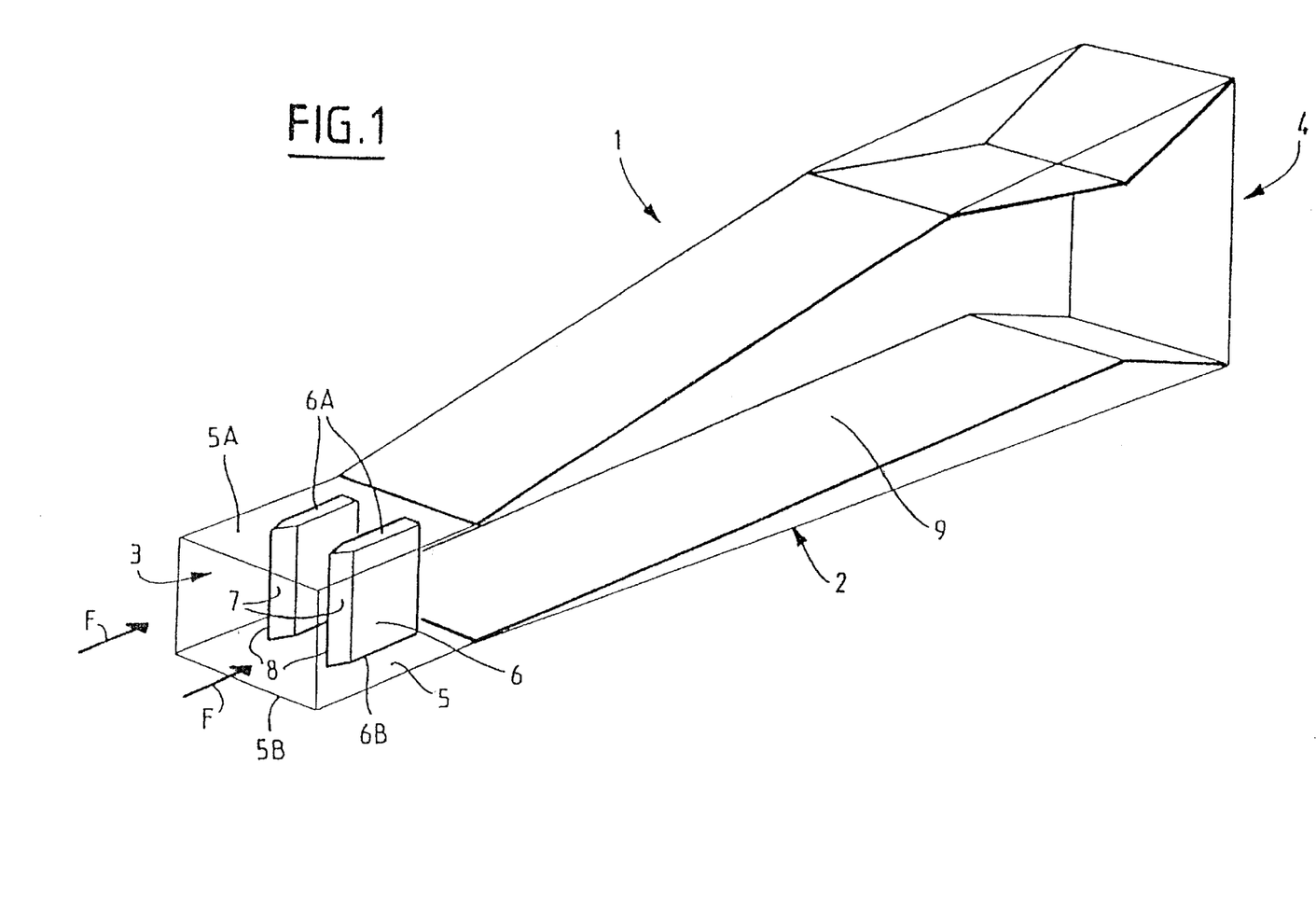
FIG. 1 is a highly schematic perspective view of one embodiment of a ramjet provided with fuel injection struts, the envelope of said ramjet being assumed to be transparent.

The ramjet 1 shown in FIG. 1 is designed to propel a hypersonic aircraft (not shown) intended to fly in a wide range of Mach numbers, for example in the range from approximately Mach 3 to a Mach number in the order of 12 to 15.

The ramjet 1 includes an envelope 2 having at one end an air inlet 3 for a flow of air to serve as the combustion-supporting gas (symbolized by arrows F) and at its opposite end a nozzle 4. Downstream of the air intake 3 the envelope 2 forms an injection chamber 5 inside which there are two fuel injection struts 6 disposed transversely to the flow F of combustion-supporting gas. The injection struts 6 each have a stem 7 with a leading edge 8 receiving said flow of combustion-supporting gas and they are attached to the envelope 2 by fixing their ends 6A and 6B to the inside face of two opposite walls 5A and 5B of the injection chamber 5. Between the injection chamber 5 and the nozzle 4 the envelope 2 delimits a combustion chamber 9 in the upstream part of which there are igniters (not shown). In their rear part or stern (i.e. facing the combustion chamber 9), said injection struts 6 include longitudinal injection manifolds (not visible in FIG. 1, but shown in FIG. 3 in particular).

Thus the fuel is distributed throughout the flow F of combustion-supporting gas at the level of the injection struts 6 and the fuel/combustion-supporting gas mixture burns in the combustion chamber 9, after which the combustion gases are ejected via the nozzle 4. The fuel can be kerosene for the lowest Mach numbers (up to Mach 8), possibly with bubbling of hydrogen to facilitate ignition of the ramjet and breaking up of the jet), then hydrogen for higher Mach numbers. Other fuels such as methane, endothermic hydrocarbons and synthetic fuels can equally be used in a ramjet of this type.

In the particular embodiment shown in FIG. 1 the envelope 2 of the ramjet is a passage of rectangular or square cross-section consisting of four walls opposed in pairs (assumed to be transparent in FIG. 1). Obviously a configuration of this kind is in no way limiting on the invention.

As mentioned hereinabove, the leading edge 8 of the stem 7 of the injection struts 6 is subject to very high heat flows when the flow of combustion-supporting gas corresponds to hypersonic flight. Accordingly, at Mach 12, the leading edge of the stem can be heated to a temperature in the order of 5 000 K.

FIGS. 2 through 8 show one embodiment of an injection strut 6 in accordance with the invention able to withstand thermal stresses of this magnitude.

Figure 2:
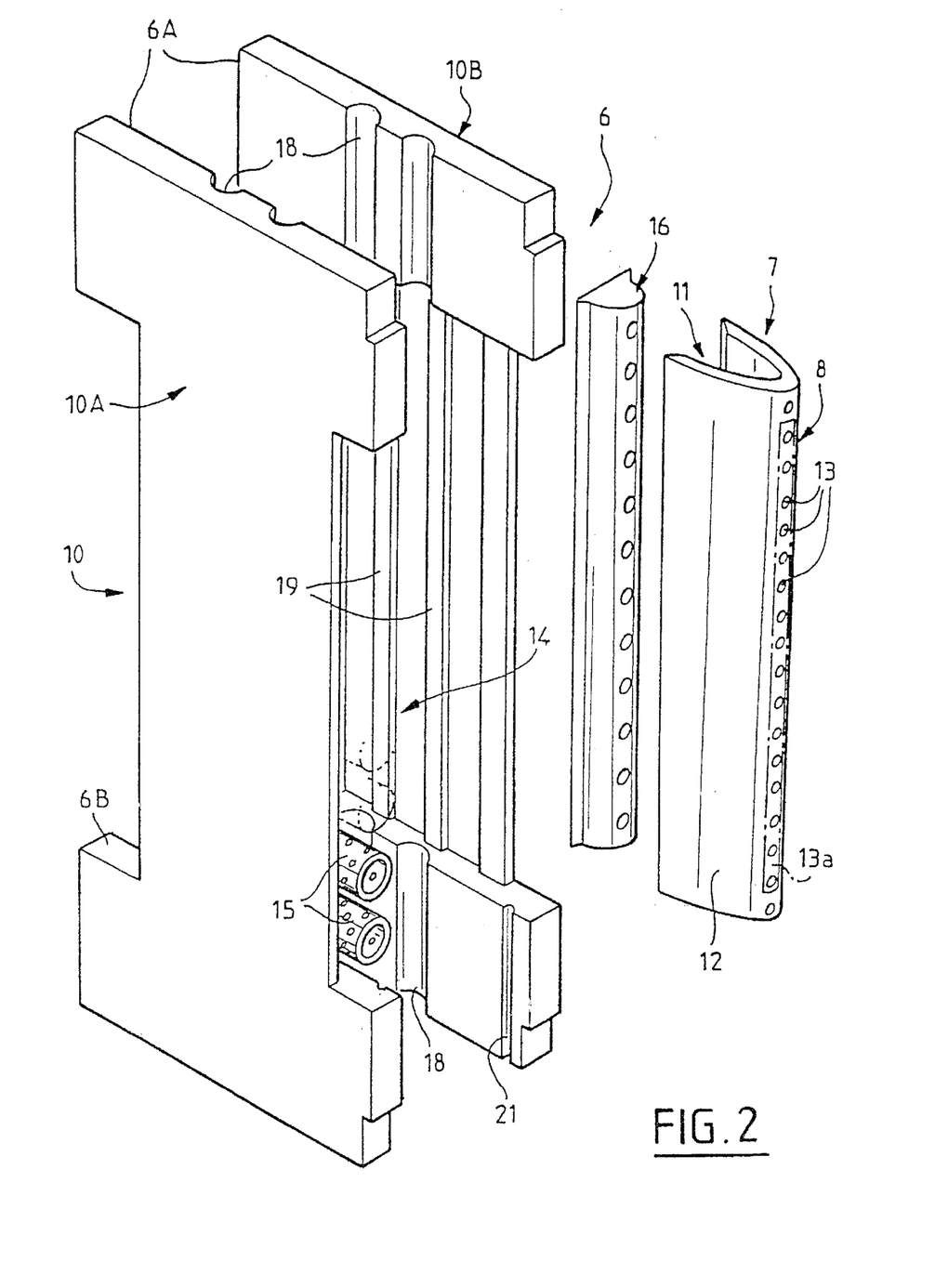
FIG. 2 is an exploded perspective view of one embodiment of the fuel injection strut in accordance with the present invention.

As shown in these figures, in this embodiment, the fuel injection strut 6 includes a metallic body 10 which can, as shown in FIG. 2, be formed of two half-bodies 10A, 10B assembled together, and said stem 7, consisting of one substantially dihedral shape, for example metallic, part the edge of which forms the leading edge 8 of the stem 7 and the concave side of which defines a chamber 11. As already indicated, at least in the vicinity of its leading edge 8, the stem 7 is formed by a wall 12 permeable to jets of cooling fluid.

The latter can be made, at least in the vicinity of the leading edge 8 of the stem 7, of a material permeable to the cooling fluid jets, i.e. in this case, the permeability of the wall is provided by the inherent porosity of the material used. Nevertheless, as shown in the figures, the wall 12 of the stem 7 can equally feature a series of perforations 13 or a slot 13a (shown in chain-dotted line in FIG. 2) extending along the leading edge 8 of the stem 7. Note that any other device assuring the required permeability in conjunction with sufficient mechanical strength may equally be envisaged.

For example, and remembering that any dimensions depend of course on the particular application and circumstances, typical dimensions at the stem can be a thickness in the order of 30 mm, a leading edge radius in the order of one millimeter, a stem angle of 6°, a length of a few tens of centimeters and a span of up to 1 m. In this regard, the drawings and in particular FIG. 2 must not be regarded as accurately illustrative of such dimensions, but have been prepared with the emphasis on clarity of representation.

Given that an advantageous cooling fluid is the fuel itself, a small portion of which can be injected through the leading edge to cool the latter at the highest flight Mach numbers (above Mach 6, for example), the internal structure of the body 10 of the injection strut 6 constituting the embodiment of the invention shown in FIGS. 2 through 8 will be described in detail hereinafter.

As shown in FIG. 2 in particular, the two half-bodies 10A, 10B define an internal cavity 14 inside the injection strut 6 in which there are a plurality of elementary chambers 15 each in the form of a perforated cylinder open at both ends. The chambers 15 are disposed one on top of the other and with a certain distance between them in the cavity 14 in a row and a first end 15A of each of them opens into the concave side of the stem 7, preferably through a corresponding orifice 16A of a part 16 forming a kind of cap, covering all the ends 15A of the chambers 15. Each other end 15B of the chambers 15, at the stern of the injection strut 6, is in the form of a main fuel injector.

A secondary fuel injector 17 is provided in each gap between two chambers 15 at the stern of the injection strut 6.

The whole is fed with fuel via supply pipes 18 in the ends 6A, 6B of the strut 6 built into the opposite walls 5A, 5B of the injection chamber 5. The fuel is distributed into the cavity 14 via the perforated chambers 15, being channeled by longitudinal ribs 19 defining openings 20 along the height of the cavity 14.

Figure 3:
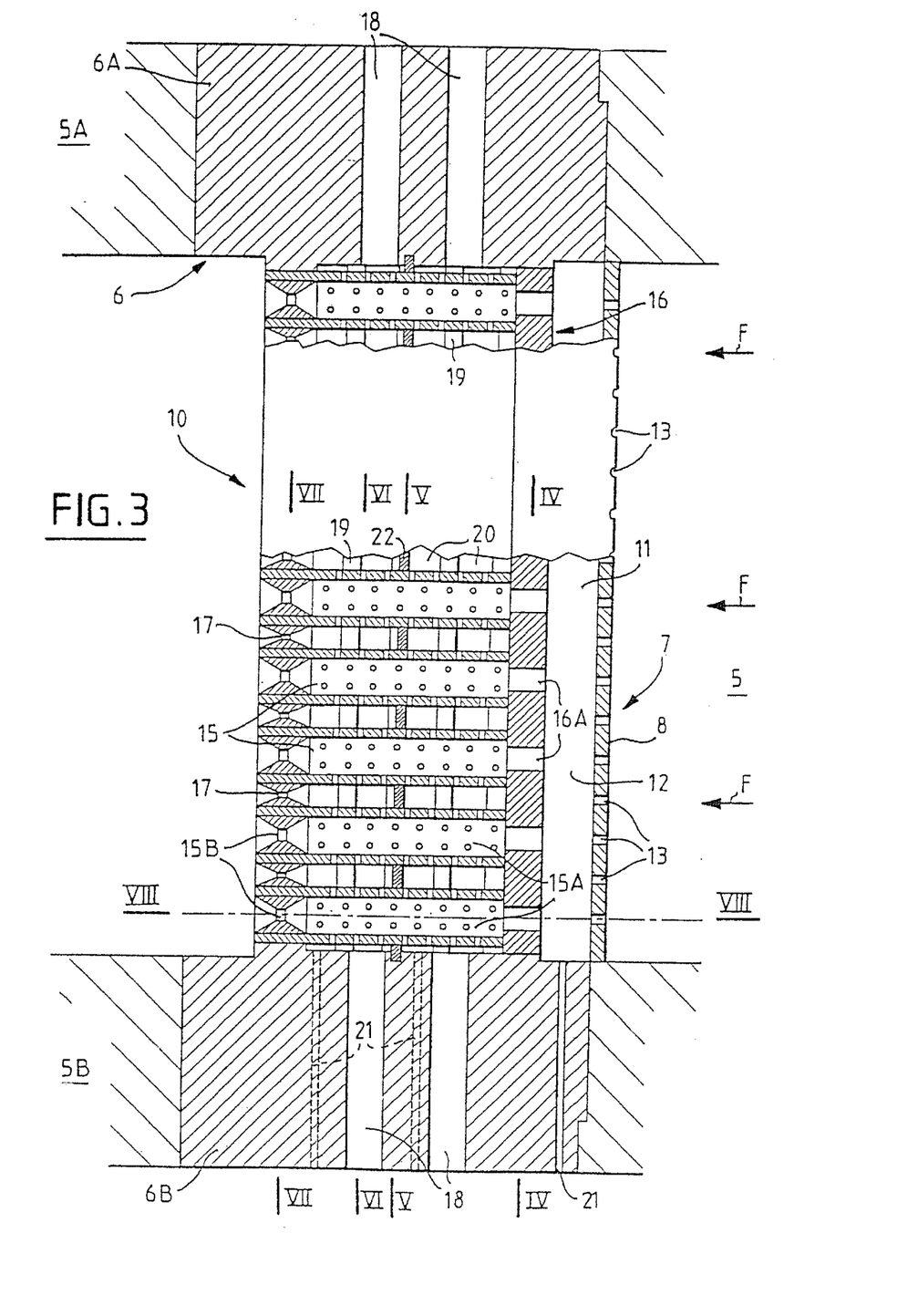
FIG. 3 is median view in longitudinal section of the strut from FIG. 2.
Figure 4:
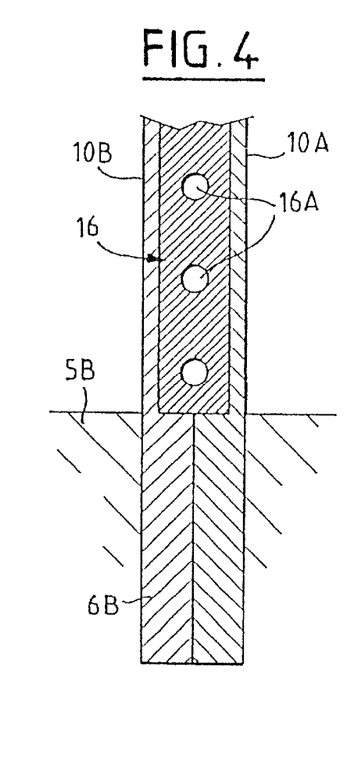
FIGS. 4, 5, 6, 7 and 8 are views of said fuel injection strut respectively taken along the lines IV—IV, V—V, VI—VI, VII—VII and VIII—VIII in FIG. 3.
Figure 5:
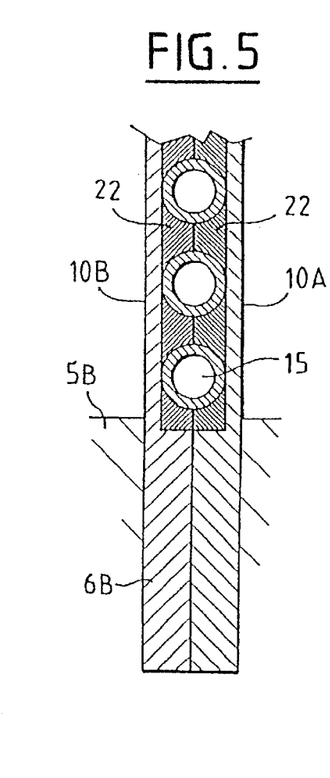
Figure 6:
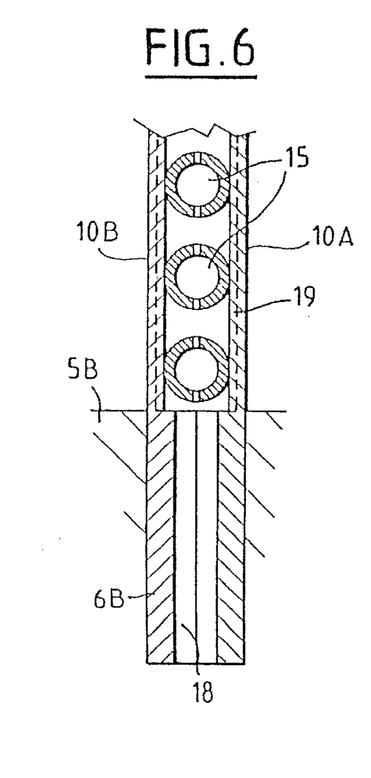
Figure 7:
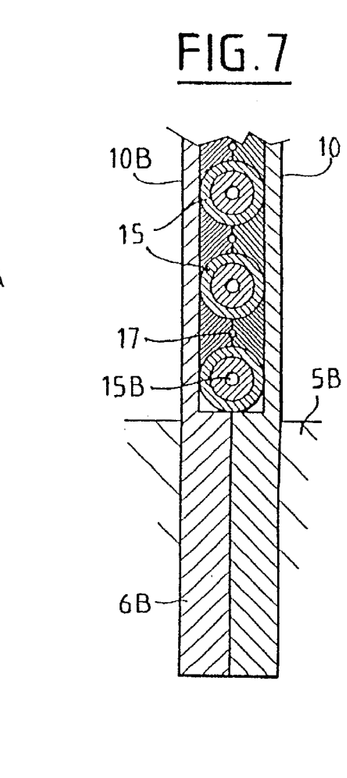
Figure 8:
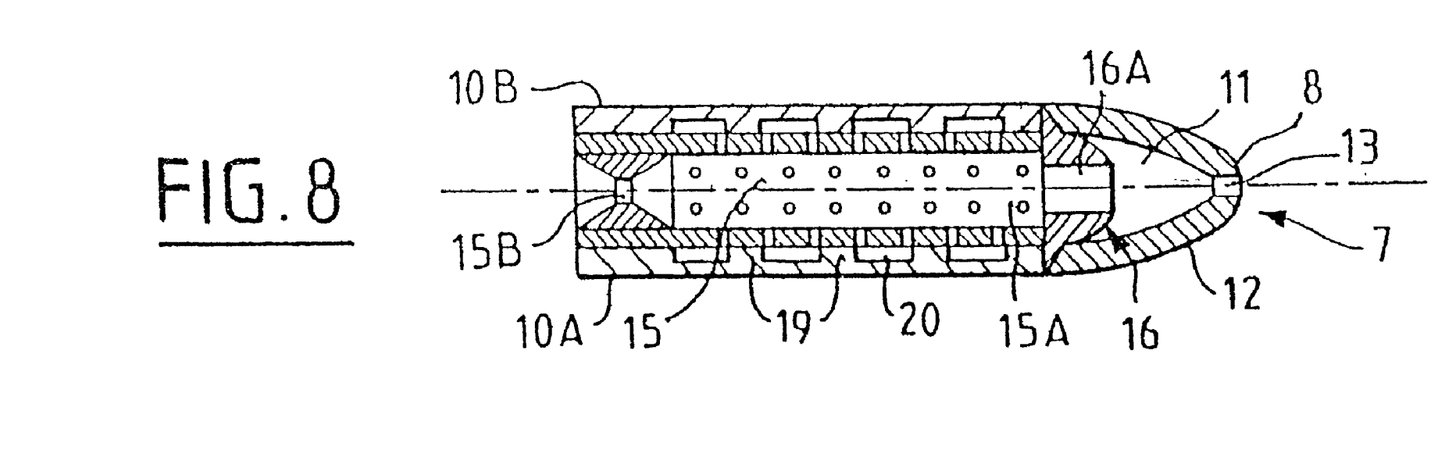

Pressure offtakes 21 are shown in FIGS. 2 and 3 and FIG. 3 shows a plate 22 for supporting the chambers 15 and holding them in place (see also FIG. 5).

Figures 9, 10:
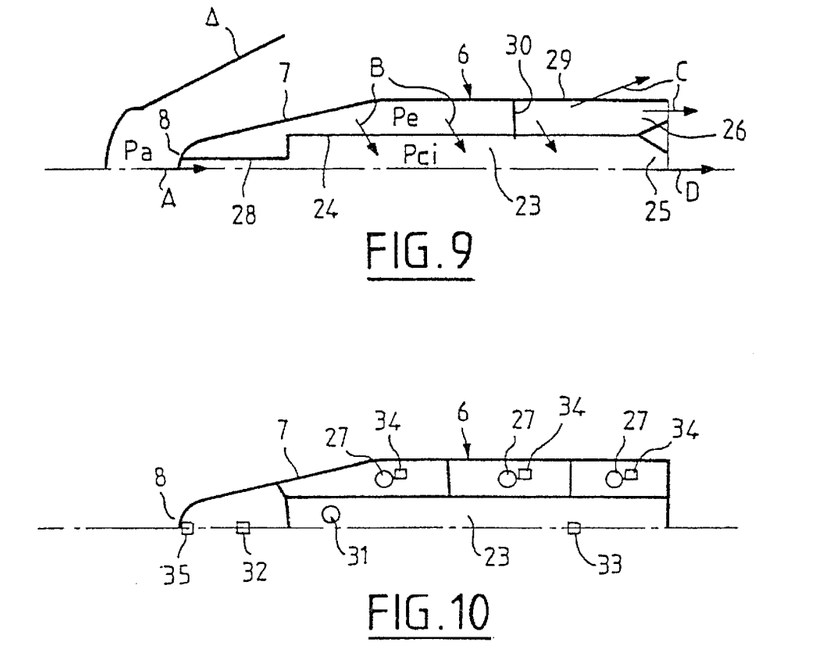
FIG. 9 is a schematic half-view in cross-section of part of a fuel injection strut in accordance with the invention in the flow of fuel and combustion-supporting gas.
FIG. 10 is a schematic half-view in cross-section of the part of the injection strut from FIG. 9 in the walls of the motor, showing lateral fuel feeds.

FIGS. 9 and 10 further illustrate the invention with a simplified embodiment of the injection strut 6 having a stem 7 with a permeable leading edge 8.

The simplified representation of the injection strut in FIGS. 9 and 10 enables a clearer explanation of the two authorized operating modes of the strut structure in accordance with the invention, with reference to FIGS. 11 and 12 hereinafter.

FIG. 9 shows, in a variant of the embodiment shown in FIGS. 2 through 8 but employing the same general principle, an internal chamber 23 with a permeable wall 24. The main injection of fuel into the flow is effected via orifices 25 and secondary injection via orifices 26, which injections can advantageously be sonic or supersonic.

FIG. 10 shows fuel feeds 27 equipped with a pressure and flowrate adjuster device (not shown).

The passage 28 enables communication between the permeable leading edge 8 and the internal chamber 23.

The outside wall of the injection strut 6 can be locally permeable (at 29), for example for removing by means of a film effect a local excess heat flow related to the impact of a shock wave.

Stiffeners 30 may be necessary to increase the mechanical strength of the strut.

An igniter device 31 (FIG. 10) consisting of one or more electrically operated sparkplugs, for example, can be installed in the internal chamber.

Also, pressure measurements are used to control injection in accordance with the required effect. For example, the pressure at the leading edge (sensor 32), that in the internal chamber (sensor 33) and the fuel supply pressure (sensor 34) are measured. If required, measuring the temperature of the leading edge (for example by means of a thermocouple 35) can be used to trigger cooling of the latter.

The operating mode of the injection strut is controlled by acting on:
the supply of propellants with a given pressure,
the use or non-use of the igniter device,
the measurements from the pressure and temperature sensors.

The direction of flow (admission of combustion-supporting gas, in particular air, or injection of cooling fluid, in particular fuel) via the permeable leading edge of the stem of the strut—in other words, aspiration in "burner" mode or injection in "leading edge cooling" mode (FIGS. 11 and 12)—is advantageously controlled in accordance with the pressure difference between the outside (incoming air) and the inside of the strut, without using any particular mobile mechanical member (such as a valve) at the level of the injection strut.

Note further that the use of different supplies offers the facility of easy adjustment of the pressure in the internal chamber 23 while still injecting the flowrate of fuel required by the motor.

The "burner" mode (FIG. 11) is used in the event of combustion problems, typically at a low supersonic flight Mach number, when the strength of the material constituting the leading edge 7 of the strut 6 is not called into question. This corresponds to admission of air (arrow A) at the permeable (in particular perforated) leading edge 8.

So-called pilot combustion then takes place in the internal chamber 23 of the strut 6 by mixing with the fuel injected into it (arrow B). On leaving the strut (downstream end relative to the flow of air) there is then obtained, alongside injection of fuel (arrow C), a main injection of burned, for example rich gases (arrow D).

The main effect of combustion in the pilot chamber 23 is ignition and stabilization of the main combustion by creating a hot jet. Combustion in the pilot chamber, occurring in a subsonic flow and with a constant cross-section, reduces the pressure, which favors the penetration of air through the leading edge.

Figure 11:
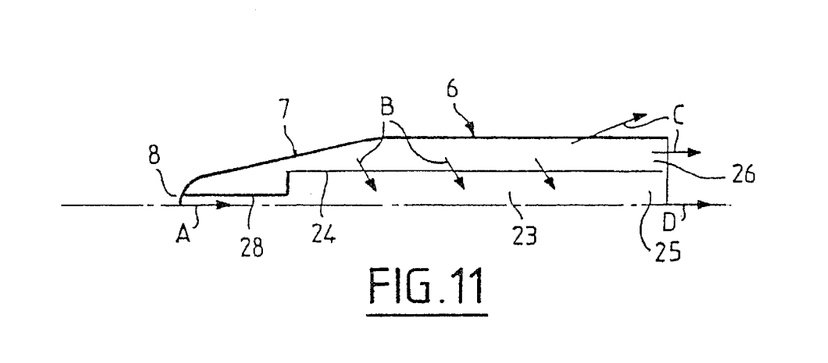
FIGS. 11 and 12, similar to FIG. 9, show two modes of operation of the injection strut in accordance with the invention.
Figure 12:
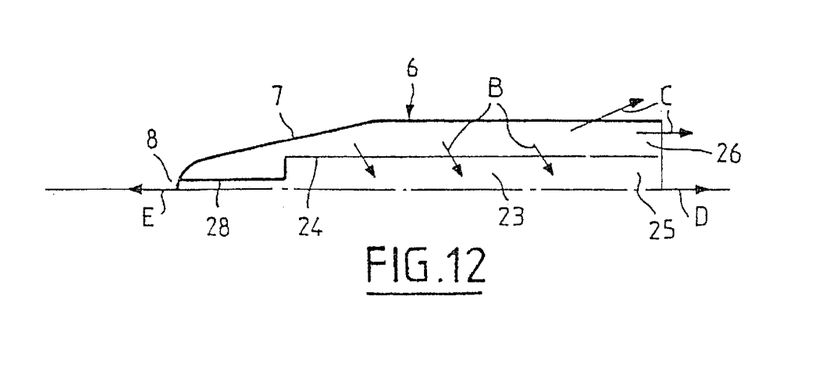

The wall of the pilot chamber is subjected to heat flows, but:
the pressure in it remains low, the mixture is rich and the heat flows generated remain reasonable,
the fuel cools this chamber (which can also be made of a high temperature resistant material, if necessary):
 1/ by circulation, in particular where injection of fuel is used (arrows C),
 2/ by parietal cooling (transpiration or effusion) if a permeable wall technology is chosen for the pilot chamber, as shown in FIG. 11.

Ignition is controlled in the following fashion.

When the air stop temperature is sufficient for self-ignition (1 000 K with hydrogen, for example) it is not necessary to use the igniter device 31.

On the other hand, if the flight conditions are such that self-ignition of the mixture does not occur in the pilot chamber, the igniter device must be used. If, for any reason, ignition is to be avoided under these conditions, the control of the igniter device provides an additional degree of freedom.

Also, the main combustion to the rear of the injection strut can take place in a subsonic or supersonic flow. The air scooped up by the main air intake flows around the injection strut and burns with the remaining fuel in the rich burned gases (arrow D) and with that injected at the level of the arrows C, if necessary.

At least one of the fuel supplies 27 can be used to inject oxygen or another combustion-supporting gas, for example to increase the thrust if the mission requires it (this is known as ejector ramjet operation).

The "leading edge cooling" mode (FIG. 12) is used when the strength of the material constituting the leading edge is called into question. As already indicated, this corresponds to injection of cooling fluid (in particular fuel) through the permeable leading edge 8 of the stem 7 of the injection strut 6.

Under these conditions, the internal chamber contains only fuel which passes through it before it is injected partly towards the front—in the direction of flow of the combustion-supporting gas—(to cool the leading edge 8 of the stem 7 by creating a protective film around the latter) and partly towards the rear, forming the main injection of fuel (arrow D') and possibly auxiliary injections (arrows C), for injection and combustion in the motor.

In this case no combustion takes place in the internal chamber: the air, the conditions of which would be sufficient for self-ignition, then is at a pressure less than that of the fuel and therefore cannot penetrate into the internal chamber.

By way of illustration, there will be indicated hereinafter a numerical example relating to different pressures of the system for a ramjet propelling an aircraft flying at Mach 3 to Mach 15.

Using the following notation (see FIG. 9):
Pa: the pressure of the air behind the straight part of the detached shockwave Δ at the leading edge 8 of the strut,
Pci: the pressure in the internal chamber,
Pe: the injection pressure of the fuel or more generally the propellants (i.e. that injected into the strut and controlled, ignoring head losses),
note that:
Pa depends on the shape of the strut and on the incident aerodynamic conditions,
Pe is controlled in accordance with the effect to be obtained and the response of the system,
Pci is the result of the chosen operation.

It must be remembered that the main control parameters are:
the supply pressure which generates Pe,
the use or not (YES; NO) of the igniter device.

The table below summarizes the orders of magnitude of the pressures obtained in the various parts of the system:

|  | * | Pa (bars) | Pe (bars) | Pci (bars) |
|---|---|---|---|---|
| Mach 3 | YES | 2.6 | 2 | 8 |
| Mach 5 | NO | 6 | 4 | 10 |
| Mach 6 | NO | 7.5 | 25 | 30 |
| Mach 8 | NO | 9 | 25 | 30 |
| Mach 15 | NO | 10 | 40 | 45 |

*use of the igniter device

The pressure of injection via the main and secondary injectors must be higher than the local pressure of the air and, if possible, the injection conditions must be favorable to mixing of the injected fluid with the air flowing around the strut.

The need to cool the combustion chamber and the thrust requirements often imply operation with a fuel flowrate that increases sharply from Mach 10, which explains the significant increase in Pe in the above table between Mach 8 and Mach 15.

As previously indicated, the fuel injection strut of the invention has many advantages. However, it is particularly suitable for a ramjet operating over a wide range of supersonic and hypersonic Mach numbers and using, at least in part, a fuel that can present ignition difficulties, such as kerosene. It is also highly beneficial when it is required to use supersonic combustion for flight Mach numbers below 6 or if, for various reasons, assistance with ignition is needed.

The basic idea of the invention is therefore, apart from cooling the leading edge of the injection strut by injecting a cooling fluid (for example fuel) through the latter at the highest speeds ("leading edge cooling" mode), to facilitate ignition at the lowest speeds by admitting air into the interior of the strut ("burner" mode), fully exploiting the two-way permeability of the leading edge.

Note further that this valve function is obtained without any mechanical member at the level of the injection strut, simply by controlling the pressure difference between the incident air and the interior of the strut.

What is claimed is:

1. A fuel injection strut for a ramjet for operating at high Mach numbers and including a combustion chamber for receiving a flow (F) of combustion-supporting gas, said strut comprising:

a first end including a stem having a leading edge for receiving said flow of combustion-supporting gas and a second end forming a longitudinal manifold of individual fuel injectors disposed in said flow of combustion-supporting gas transversely relative to a direction of said flow of combustion-supporting gas and distributing said fuel into said flow of combustion-supporting gas, injection means for generating a plurality of jets of a cooling fluid distributed along said stem, and a body having an internal cavity for a supply of fuel, said internal cavity opening at a front end into a front chamber and having main fuel injectors at a stern end, wherein:

said stem comprises two-way permeability means for providing two-way permeability to both a cooling fluid and said combustion-supporting gas by providing, at least in a vicinity of said leading edge, a wall of a substantially dihedral shape which defines said front chamber on a concave side, said wall, in a first way, providing said flow of combustion-supporting gas to permeate at least in a region of said leading edge into said internal cavity for fuel combustion at a first Mach number, and in a second way, providing a cooling flow of said jets of the cooling fluid to permeate at least in a region through said leading edge by said injection means, which impinges the cooling fluid on the concave side of said wall at a second Mach number which is greater than said first Mach number.

2. An injection strut according to claim 1, wherein said wall of the stem is made from, at least in a vicinity of the leading edge of the stem, a material permeable to the jets of the cooling fluid.

3. An injection strut according to claim 1, wherein said wall of the stem has at least one series of perforations extending along the leading edge of the stem.

4. An injection strut according to claim 1, wherein said wall of the stem has at least one slot extending along the leading edge of the stem.

5. An injection strut according to claim 1, wherein the cooling fluid comprises fuel.

6. An injection strut according to claim 1, further comprising a plurality of individual combustion chambers disposed in said internal cavity, said individual chambers being vertically arranged in a column with a particular spacing from each other in said cavity, a first end of each of said individual chambers opening into the concave side of the stem, and a second end of each of said individual chambers at the stern of the injection strut being in the form of a main fuel injector.

7. An injection strut according to claim 6, further comprising a cover (16) in the form of a cap provided with corresponding orifices covers all of the first ends (15) of said chambers (15).

8. An injection strut according to claim 6, wherein a secondary fuel injector is provided at the stern of the strut in each gap between two individual chambers.

9. An injection strut according to claim 6, wherein each said individual chamber is in the form of a perforated cylinder open at both ends.

10. An injection strut according to claim 1, wherein said body of said strut comprises two opposing walls which define said cavity, said two opposing walls each having a first end and a second end which define supply passages along opposing surfaces of said two walls for supplying fuel to the injection chamber of the ramjet.

11. An injection strut according to claim 10, further comprising sensors for measuring the pressure at the leading edge, the pressure inside the strut and the fuel supply pressure.

12. An injection strut according to claim 11, further comprising a sensor for measuring the temperature of the wall of the leading edge.

13. An injection strut according to claim 1, wherein said two-way permeability means does not include valves for control of permeation through said at least said leading edge between said first way and said second way.

14. An injection strut according to claim 1, further comprising an ignitor for the combustion of fuel in said internal cavity.

* * * * *